(12) United States Patent
Edlinger

(10) Patent No.: US 6,241,797 B1
(45) Date of Patent: Jun. 5, 2001

(54) PROCESS FOR REDUCING OXIDIC SLAGS

(75) Inventor: Alfred Edlinger, Baden (CH)

(73) Assignee: "Holderbank" Financiere Glarus AG, Glarus (CH)

( * ) Notice: Subject to any disclaimer, the term of this patent is extended or adjusted under 35 U.S.C. 154(b) by 0 days.

(21) Appl. No.: 08/834,382

(22) Filed: Apr. 16, 1997

(30) Foreign Application Priority Data

Apr. 19, 1996 (AT) ........................................ 717/96

(51) Int. Cl.⁷ ............................ C21B 11/10; C22B 13/00; C22B 19/00; C22B 15/00
(52) U.S. Cl. ..................... 75/10.14; 75/10.15; 75/10.29; 75/10.3; 75/500; 75/658; 75/694; 75/640
(58) Field of Search ............................. 75/500, 501, 507, 75/561, 567, 560, 640, 961–962, 10.14, 10.29, 10.3, 658, 694, 10.15; 266/227, 232, 201; 588/201, 234, 256; 422/232; 110/344, 259

(56) References Cited

U.S. PATENT DOCUMENTS

| | | | |
|---|---|---|---|
| 3,032,411 | * 5/1962 | Johnson | 75/640 |
| 5,259,863 | 11/1993 | Schneider et al. | 75/414 |
| 5,402,439 | 3/1995 | Bullmann et al. | 373/9 |
| 5,776,226 | * 7/1998 | Edlinger | 75/500 |
| 5,800,592 | * 9/1998 | den Hartog et al. | 75/453 |

FOREIGN PATENT DOCUMENTS

| | | | |
|---|---|---|---|
| 2159137 | * 4/1996 | (CA) . | |
| 515792 | 3/1992 | (EP) . | |
| 556 608 | 8/1993 | (EP) . | |
| 0639091 B1 | 2/1995 | (EP) . | |
| 1475949 | * 4/1989 | (RU) | 75/640 |
| 93/22001 | 11/1993 | (WO) . | |
| 94/11541 | * 5/1994 | (WO) . | |
| 96/07760 | 3/1996 | (WO) . | |

* cited by examiner

Primary Examiner—Melvyn Andrews
(74) Attorney, Agent, or Firm—Pillsbury Madison & Sutro LLP

(57) ABSTRACT

There is disclosed a process for reducing oxidic slags or combustion residues above a metal bath. The metal bath is formed of an iron alloy containing metals nobler than iron and whose redox potential is adjusted such FeO is reduced to Fe not at all or only partially.

17 Claims, 3 Drawing Sheets

PROCESS FOR REDUCING OXIDIC SLAGS

BACKGROUND OF THE INVENTION

1. Field of the Invention

The invention relates to a process for reducing oxidic slags or combustion residues above a metal bath.

2. Description of the Related Art

Oxidic slags more or less completely oxidized occur, for instance, in the incineration of waste or gasification of waste. Attempts have been made to subject such slags occurring during waste incineration or waste gasification to metallurgical aftertreatments immediately thereupon in order to obtain slags that may be used as starting substances or additive components in the cement industry on account of their puzzolanic properties. However, in addition to involving a relatively complex process, this also involves capital expenditures that are relatively high in the waste incineration field such that plants of that kind must be conceived especially with a view to the respective aim set. Yet, waste incineration slags as well as dusts occur in a number of communal incineration plants, wherein the high capital expenditures required for metallurgical aftertreatment would considerably increase costs for disposal, in particular, in small-scale waste incineration plants.

SUMMARY OF THE INVENTION

The invention aims at providing a process for reducing oxidic slags or combustion residues above a metal bath, in which oxidic slags of different origin and loaded with different heavy metal oxides or toxic substances are processed centrally thereby providing the opportunity of homogenizing the charging substances by simple mixing techniques, such as, for instance, mixed bed techniques, and controlling the final concentration of heavy metals within the slag more precisely by applying simpler metallurgy. To solve this object, the invention substantially resides in a process in which the metal bath comprising an iron alloy comprising metals nobler than iron, such as, e.g., an FeNi or FeCu or Sn alloy, is provided, whose redox potential is adjusted such that reduction of FeO to Fe is avoided. In principle, the reduction of iron oxide to iron can be avoided by means of a pure iron bath or a steel bath, yet relatively high temperatures are required in that case. At temperatures of above 1700° C. undesired problems occur with the refractory lining. By using for the bath an iron alloy comprising metals nobler than iron and whose redox potential is adjusted such that FeO is not reduced to Fe, a slag is immediately formed at substantially lower process temperatures, from which slag heavy metals have been separated and in which chromium, if present, has been safely converted from the hexavalent into the trivalent stages. The remaining heavy metal content of the slag is in the range of that of naturally occurring rocks, the reduced slag melt exhibiting excellent puzzolanic and good hydraulic properties. The overall heavy metal content of slags reduced in the manner according to the invention is substantially lower than that of fly ash mixed cement used by comparison, wherein, due to the relatively high content of bivalent iron, which may amount up to 20% within the slag, a reduction potential offering a significant protection against corrosion in steel-concrete structures remains when using such slags, mortar or concrete. At the same time, it is ensured that toxic hexavalent chromium is safely reduced to non-toxic trivalent chromium. The redox potential adjusted for the desired incomplete reduction of the slag simply may be defined via the free enthalpy as follows:

$RT \ln p_{o2}$ is to be between 250 and 420 kJ/mol $O_2$, wherein on grounds of the temperature dependence of the free enthalpy values of about 320 kJ/mol $O_2$ at 1400° C. and about 290 kJ/mol $O_2$ at 1500° C. are preferably adjusted. Adjustment advantageously is effected in a manner that an oxygen partial pressure of approximately $10^{-10}$ atm is obtained, wherein the ratio of $CO/CO_2$ may be between 1:1 and 1:10.

In order to ensure, at such relatively low process temperatures, that the reduction takes place quantitatively in the desired manner, advantageously flush gas may be introduced through the metal bath via bottom tuyeres, thereby enhancing reduction kinetics.

In order to ensure that iron oxide will not be reduced to iron, the carbon content of the metal bath must not become too high. The use of graphite electrodes for heating the metal bath is not beneficial for that reason. Advantageously, the invention provides for heating the metal bath indirectly, in particular, inductively, thereby safeguarding a sufficiently low carbon content within the bath.

With a view to providing a precise process control and obtaining a uniform purity of the slag, Al, FeSi or C is advantageously added to the metal bath in order to adjust its redox potential. If an iron-nickel alloy is present, the invention provides for proceeding in a manner that the C content is maintained at below 5% by weight, preferably below 4% by weight, in order to prevent the formation of nickel carbides.

The process according to the invention in the first place is suitable for disposing of waste incineration slags of different origin centrally. In order to ensure that a completely oxidized slag is actually present, the oxidic slags before being discontinuously charged onto the metal bath are melted in an oxidizingly operated reactor and are transferred into a fore-hearth, from which Cu is tapped in the form of a melt at temperatures of above 1500° C. A meltdown oxidizing reactor of that kind may be charged with a mixed bed slag via its charging opening so as to ensure a uniform quality of the charging slag by simple mixing techniques. It is also feasible to charge wet slag into a meltdown oxidizing reactor of that kind, the slag in that case being dried first, preheated afterwards and, in addition, liquefied. The gas passing through the slag must have a sufficiently high oxygen partial pressure such that all of the oxidizable components contained in the slag, such as unburnt matter, residual carbon, scrap metals, such as, for instance, iron, aluminium or the like, are burnt and oxidized. The same holds for sulfur compounds and chloride compounds. The process may be controlled in a manner that the furnace offgases have temperatures approximately ranging between 200° C. and 300° C. such that possibly formed dioxins and furans primarily will remain in the slag, a dynamic equilibrium between synthesis and oxidative degradation thus building up within the slag column. In doing so, chloride and sulfur compounds are decomposed quantitatively, free chlorine and $SO_2$ being drawn off along with the furnace offgases due to the high oxygen partial pressure adjusted. At the same time, it is ensured that with the simultaneous introduction of filter dusts the latter are directly introduced into the silicate slag melt under strictly oxidizing conditions, thereby forming a heavy metal sink within the silicate slag melt at a temperature of below 1350° C. Thus, heavy metal is retained quantitatively. By the fact that a fore-hearth is connected to the oxidizingly operated reactor, the temperature in that fore-hearth may be raised and brought to above 1500° C., for instance. At that temperature, practically all of the copper compounds and, in particular, also the intermediarily formed copper silicate dissociate. The metallic liquid copper formed collects in the sump of the fore-hearth of the shaft furnace and from there can be tapped periodically and hence be recovered in a relatively pure form. A copper content of more than 85% may be realized without difficulty. All the other heavy metals, such as primarily zinc and lead are slagged almost completely under the above-mentioned conditions.

In order to maintain the desired temperatures of above 1500° C. for the purpose of dissociating copper silicate, the fore-hearth advantageously may be heated by means of auxiliary burners while effecting overstoichiometric combustion within the gas space. Alternatively, hot offgases from a melter cyclone may be introduced, which will flow through the shaft furnace under energetic utilization of the waste heat.

In order to continue to safely maintain oxidative conditions also in that case, air or oxygen advantageously may additionally be blown through the slag bath of the fore-hearth.

As already pointed out, the process according to the invention is useful preferably for charging slags and/or dusts and/or combustion residues derived from waste incineration or from sewage sludge disposal and/or dry sewage sludge, wherein also incompletely burnt slags and dusts as well as sewage sludge still having high portions of yet combustible admixtures or noxious substances can be safely oxidized. Thus, it is, for instance, possible to dispose of sludge ashes in an unproblematic manner, since due to the efficient separation of heavy metals and the high phosphate contents contained in sewage sludges a high-quality phosphate fertilizer free of heavy metals ("Thomas meal") may be produced. The oxidation reactor also may be directly charged with sewage sludge.

Preferably, the process according to the invention may be carried out in a manner that the meltdown reactor is designed as a shaft furnace, a cupola furnace and/or a melting cyclone, arranged in open communication with the fore-hearth. In particular, in case of a shaft furnace the shaft furnace offgas can be drawn off at relatively low temperatures so as to avoid the risk of dioxins and furans recombining outside the meltdown reactor. When working up large dust amounts and using dry sewage sludge or car shredder light fraction (Resh), the use of a melting cyclone is particularly advantageous, the waste heat thus being directly usable for heating the fore-hearth and the shaft furnace. In order to render feasible the flexible processing of different charging materials, a melting cyclone may be connected to the fore-hearth in parallel with the shaft furnace to oxidize and burn dusts and dry sludges. The waste heat and hot offgases of the melting cyclone may be introduced directly into the gas space of the fore-hearth.

As already mentioned, the adjustment of the redox potential in the metal bath reactor, i.a., may be effected by blowing in carbon, for instance, along with nitrogen, an additional control being feasible by separately blowing in $O_2$ or air. Any further partial combustion of carbon monoxide thus formed may be ensured above the iron bath by blowing hot air or oxygen into the slag, thereby additionally controlling the desired reduction. In doing so, it is advantageously proceeded in a manner that the gas drawn off the gas space above the reducing metal bath is cooled with a view to separating Zn and Pb and the remaining CO is afterburnt within the melter oxidator in an overstoichiometric manner.

DESCRIPTION OF THE DRAWINGS

In the drawings, systems that are useful for carrying out the process according to the invention are schematically illustrated, wherein.

DETAILED DESCRIPTION OF THE INVENTION

Figure 1:
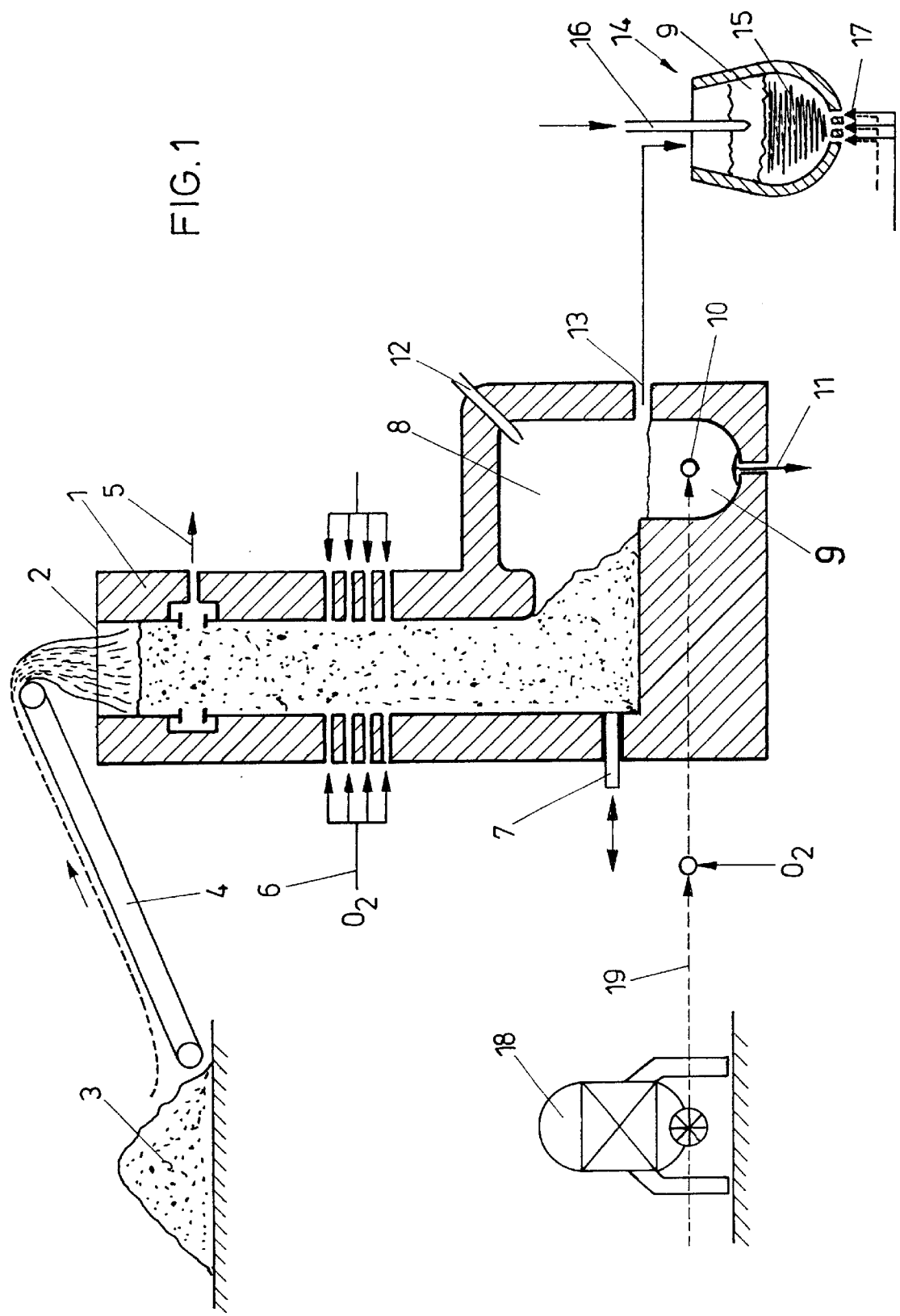
FIG. 1 illustrates a shaft furnace with a consecutively arranged metal bath reactor.

In FIG. 1, a shaft furnace 1 includes a charging opening 2, through which waste incineration slag is charged. The waste incineration slag is homogenized in a bed 3 and different slags having different compositions are adjusted to substantially the same slag analysis. A conveying means for slag is schematically indicated by 4.

The shaft furnace 1 is heated oxidatively and the charging material, via a preheating zone, from which offgas and, in particular, $SO_2$, $Cl_2$, HCl as well as volatile compounds are drawn off through openings 5, reaches a reaction zone, in which oxidative conditions are safeguarded by maintaining a high oxygen partial pressure by lancing in oxygen through conduits 6. Subsequently, the slag is melted and may be transferred into a fore-hearth 8 by aid of a ram 7. The slag melt 9 formed in the fore-hearth 8 is supplied with oxygen through submerged tuyeres 10, and copper may be tapped periodically at temperatures of above 1500° C. via a tap opening 11. The gas space of the fore-hearth 8 is heated by means of auxiliary burners 12 while effecting overstoichiometric combustion in order to maintain oxidizing conditions.

The completely oxidized slag periodically may be transferred into a metal bath reactor 14 via a slag tap 13. Into the metal bath reactor, an iron-nickel alloy has been charged as a metal bath 15. Hot air or oxygen is lanced into the slag 9 through a lance 16, the reducing conditions within the metal bath reactor 14 being ensured by the alloying elements nickel, copper or tin. Further adjustment of the redox potential may be effected by blowing in carbon through bottom tuyeres 17. At the same time, there may be blown in through said bottom tuyeres nitrogen in order to increase the turbulence of the bath and optionally oxygen for the concerted slagging of phosphorus.

Waste incineration dust may be blown into the slag bath of the fore-hearth of the shaft furnace from a silo 18 through ducts 19 by aid of compressed air or oxygen such that also waste incineration dusts may be disposed of.

Figure 2:
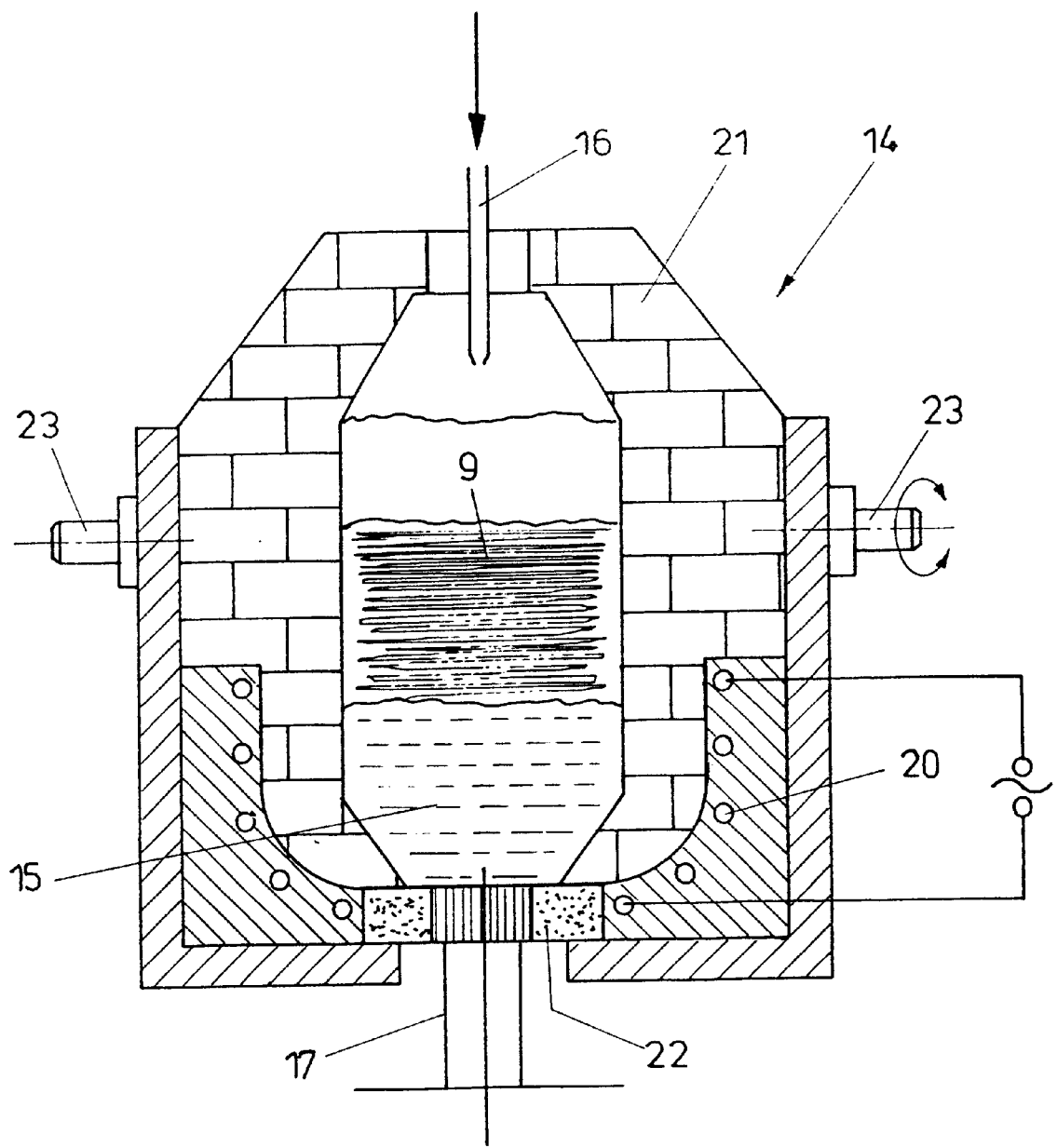
FIG. 2 is an enlarged illustration of a metal bath reactor useful for implementing the process according to the invention.

From FIG. 2 it is apparent that the metal bath reactor or converter 14 is heated by means of water-cooled induction heating spirals 20. An iron-nickel bath 15 has been provided. The refractory lining is denoted by 21. The bottom tuyeres 17 are arranged in a tuyere brick 22. The blowing lance 16 is configured as a water-cooled oxygen air lance and adjusted in the axial direction. The metal bath reactor may be mounted in a manner tiltable via pivot trunnions 23 so as to allow the respectively formed iron-oxide-containing, yet largely reduced slag to be discharged discontinuously.

Figure 3:
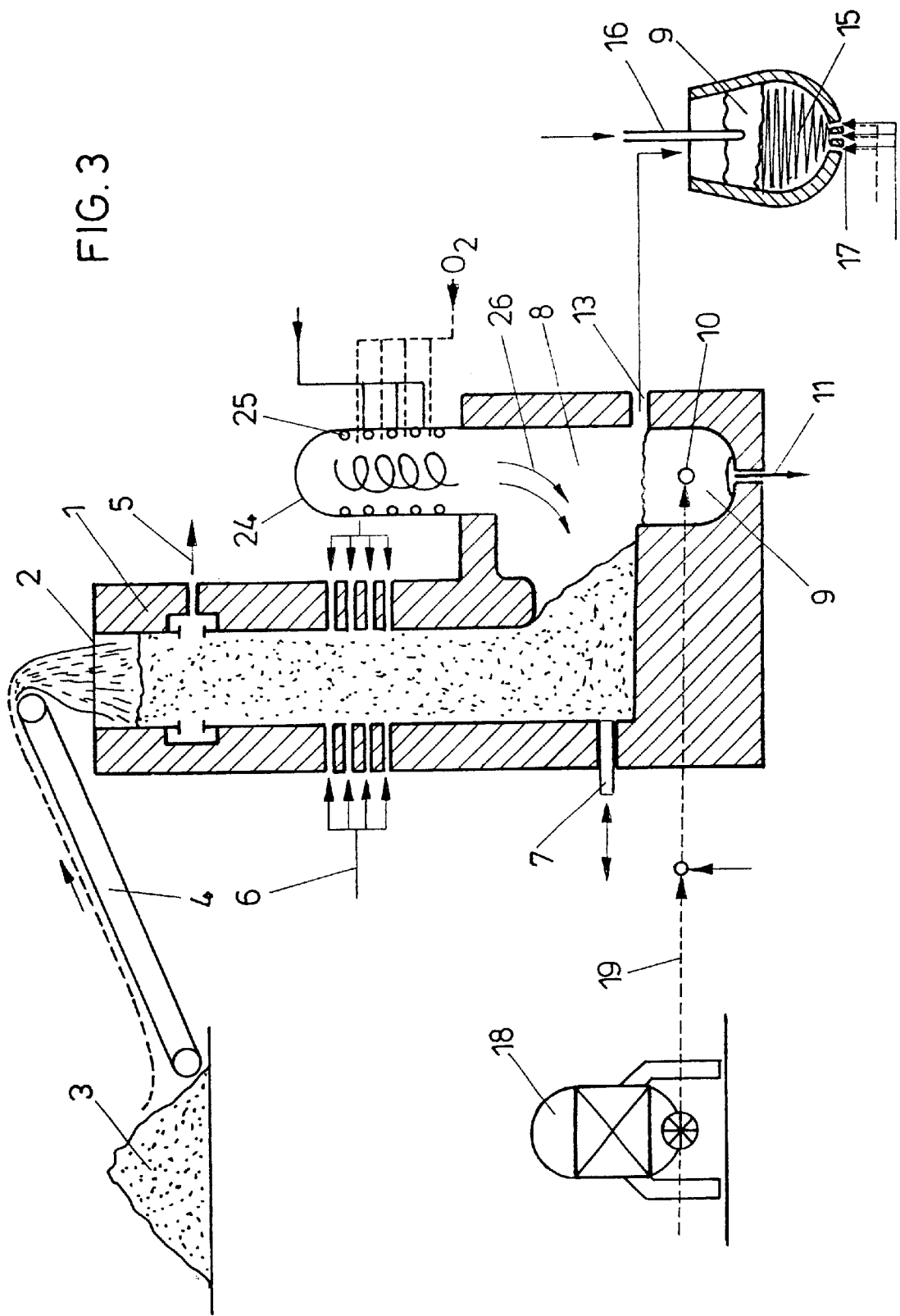
FIG. 3 illustrates an arrangement according to FIG. 1 additionally comprising a melting cyclone.

In FIG. 3 a melting cyclone 24 is connected to the fore-hearth 8 in parallel with the shaft furnace 1. The melting cyclone is charged or fueled with Resh, dry sewage sludge and/or waste incineration dusts, water-cooled coils 25 being provided for the generation of vapor and the recovery of energy. The hot gases flow through the fore-hearth 8 in the sense of arrows 26, subsequently serving to further heat the charged material in the shaft furnace 1, wherein auxiliary burners may be obviated in the fore-hearth 8. The melting cyclone is able to process charging material having a granulometry ranging between 40 $\mu$m and 7 mm.

In the following, the invention will be explained in more detail by way of an exemplary embodiment.

Exemplary embodiment and energy balance considerations:

Charging Materials

| Component | Portion (%) |
|---|---|
| Waste incineration slag (WI slag) | |
| Scrap iron | 9 |
| Scrap aluminum | 4 |
| Residual carbon | 1 |
| Subtotal | 14 |
| $SiO_2$ | 40 |
| CaO | 15 |
| $Al_2O_3$ | 10 |
| $Fe_2O_3$ | 10 |
| MgO | 2 |
| $Na_2O$ | 4 |
| $K_2O$ | 1 |
| $TiO_2$ | 1 |
| Subtotal | 83 |
| Cu | 1 |
| Ni | 0.003 |
| Cr | 0.2 |
| Zn | 0.4 |
| Pb | 0.2 |
| Subtotal | 1.8 |
| Total | 98.8 |
| WI Dust | |
| $SiO_2$ | 22 |
| $Al_2O_3$ | 19 |
| $Fe_2O_3$ | 4 |
| CaO | 24 |
| MgO | 3 |
| $SO_3$ | 6 |
| $K_2O$ | 4 |
| $Na_2O$ | 3 |
| $TiO_2$ | 2.5 |
| $P_2O_5$ | 1 |
| Cl | 5 |
| Cd | 0.04 |
| Ni | 0.02 |
| Pb | 1 |
| Cr | 0.01 |
| Cu | 0.2 |
| Zn | 3 |
| Sn | 0.15 |
| Total | 97.92 |

The WI slag was charged into a shaft furnace. MVA dust, optionally together with Resh or dry sewage sludge as additional fuels, was melted in a melting cyclone, the waste heat having been made available for heating the fore-hearth.

The following amounts of heat are released in the total oxidation of waste incineration slag:

| Component | Portion (%) | Ox-enthalpy (MJ/ton$_{slag}$) |
|---|---|---|
| Scrap iron | 9 | 540 |
| Scrap aluminum | 4 | 1200 |
| Carbon | 1 | 300 |
| Combustible matter | 14 | 2040 |

In theory, approximately 2600 MJ/ton$_{slag}$ are required for melting the dry slag. The thermal efficiency within the shaft furnace is about 65% such that an actual heat demand of 4000 MJ/ton$_{slag}$ is to be taken into account.

Thus, the difference between the "heat introduction" by the WI slag and the actual "heat demand" is (4000−2040) MJ/t=2000 MJ/ton$_{slag}$ or 560 kWh/ton$_{slag}$.

The heat demand may be lowered in case the charged slag has been burnt incompletely.

Values of 5–10% residual carbon in waste incineration slags are realistic. At a residual carbon portion of 7% in the waste incineration slag, the shaft furnace becomes self-going if operated with cold and dry slag only.

Heat Demand Upon Addition of 10% Waste Incineration Dust

Due to the high portion of chlorides contained in the WI dust, the latter must be washed to a chloride portion of <0.5%. Due to the high content of free lime, the washings react basic. This is of great advantage, causing the heavy metals to deposit as hydroxides and the chloride to go into the waste water.

$Ca(OH)_2 + 2SMCl \rightarrow CaCl_2 + SMOH$

The pH of the washings was adjusted to 10.5–12 by adding NaOH or $H_2SO_4$. The washed filter dust was filtered out of the waste water and dried to a residual moisture of 2% (110° C.). The dry WI dust was blown into the melt of the shaft furnace by means of oxygen. Thereby, the heavy metals are slagged and residual chlorides and sulfur are expelled:

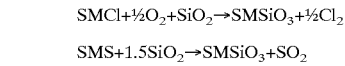

$SMCl + \frac{1}{2}O_2 + SiO_2 \rightarrow SMSiO_3 + \frac{1}{2}Cl_2$ $SMS + 1.5SiO_2 \rightarrow SMSiO_3 + SO_2$ Due to the high melting temperatures, the Cu compounds in the fore-hearth dissociate to metallic copper:

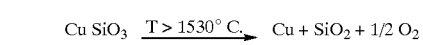

$Cu\,SiO_3 \xrightarrow{T > 1530°\,C.} Cu + SiO_2 + 1/2\,O_2$

The melt heat demand of the dry washed filter dust is about 4900 MJ/ton. Hence follows the theoretical melt heat demand of a mixture comprised of 10% dust and 90% slag to be (4900×0.1+2600×0.9)=2850 MJ/ton of mixture. The practical heat demand amounts to 4400 MJ/ton of mixture. In order for said mixture to melt open self-goingly within the shaft furnace, the residual carbon portion of the WI slag would have to be raised to about 9%. (→ incomplete burning open of the slag on grate). If this is not possible, dry sewage sludge or car shredder light fraction (Resh) may be added as fuels via burners or charged into a melting cyclone.

The slag melt oxidized at 1530° C. is practically free of copper. However, if the Cu value is still too high, it may be adjusted to practically nil in the fore-hearth of the shaft furnace by adding the slightest amounts of FeSi or sulfur-free cast iron chips.

The remaining heavy metals, in particular, Zn and Pb were slagged to the major part.

After this, the slag melt was transferred into a metal bath reactor.

Advantageously, the metal bath reactor may be charged with an Fe/Ni alloy an Fe/Ni/C alloy an Fe/Cu alloy an Fe/Cu/C alloy an Fe/Cu/Ni alloy an Fe/Cu/Ni/C alloy as well as with the overlayered slag melt.

The alloy was chosen in accordance with the desired slag metallurgy.

In the example, all of the heavy metals nobler than iron were reduced by means of an Fe/Ni alloy at a maximum of 1500° C., e.g.:

$$ZnSiO_3+(Fe/Ni)\rightarrow Zn\uparrow+FeSiO_3+(\ldots/Ni)$$

The siderophilic heavy metals evaporate (Zn, Pb). In the example, an alloy comprising 18% Ni and 82% Fe was charged. During the slag change, Fe is constantly used up by the redox procedure described above. In order to be able to evaporate a sufficient amount of Zn, the final alloy must not contain more than 56% Ni, since otherwise it would be too "noble" for the reduction of nonferrous heavy metals as is apparent from the Richardson Diagram.

The melting range of the relevant alloys always is below 1500° C. such that the service life of a refractory lining is substantially enhanced.

The above operating characteristics ensure that no slag FeO is reduced.

If ZnO or nonferrous heavy metals are to be reduced further by means of the 56% Ni alloy, this may happen by adding carbon to the alloy in stoichiometric quantities. In that case, reduction occurs via the carbon dissolved in the iron bath:

$$ZnSiO_3+(C/Fe/Ni)\rightarrow Zn\uparrow+CO+SiO_2+(\ldots/Fe/Ni)$$

If carbon is further dosed in, also the slag Fe will start to reduce and the iron content of the Ni/Fe alloy will start to increase accordingly:

$$XFeSiO_3+(C/Fe/Ni)\rightarrow XSiO_2+CO\uparrow+(\ldots Fe+Fe_x/Ni)$$

This is, however, to be avoided.

If operation takes place in the Fe/Ni system only, flushing advantageously is effected in an inductively heated converter by means of bottom flushing (N2) in order to increase the turbulence of the bath. The Fe consumed is brought back to the initial value (82% Fe) periodically or, even better, after each slag tap.

Inductive heating may be replaced with fossil heating. This, however, involves the disadvantage of the evaporated heavy metals Zn and Pb to be diluted with the combustion offgases.

Advantageously, a "final alloy" of 56% Ni is used and a stoichiometric amount of carbon, based on the amount of nonferrous heavy metals to be reduced and nobler than iron, is added in doses when operating in the C/Fe/Ni system. It has been proved beneficial to keep the carbon content of the alloy at 3% in that case. In the reduction procedure proper, the Fe/Ni alloy does not change substantially, this serving merely as a carbon carrier.

Preferably, a bottom-blowing converter is used as the furnace system.

Another essential advantage of such a process control resides in the opportunity of operating at lower iron bath temperatures (about 1430° C.) and rendering energetics more favorable and technologically simpler.

Phosphorus or sulfur possibly reduced into the Ni/Fe bath during the reduction step may be brought into a basic slag by an intermediate refining process. Calcium-phosphorus-(sulfur) slags forming constitute a chromium-free artificial fertilizer ("Thomas meal") much sought after.

However, the process control described prevents sulfur from getting into the iron bath converter. Sulfur preferably is "roasted" in the oxidizingly operated shaft furnace. The highly silicious "acid" slag does not exhibit any retaining power for sulphur and its oxidation products.

When charging Fe/Ni to ZnPb reduction, natural gas may optionally be blown in through the bottom tuyere. Natural gas does not react with the metal bath, but acts as an agitating medium in the liquid phase (slag/metal bath suspension). The natural gas passing through the liquid phase is burnt in the upper part of the converter (gas space) by means of a lance. Thereby, the converter is kept hot, the combustion heat being transferred to the turbulent suspension via radiation heat. The evaporating heavy metals Zn and Pb are oxidized, leaving the converter mouth along with the offgases.

Alternatively, induction heating may be applied. Nitrogen serves as an agigating medium. Zn and Pb evaporate and may be condensed metallically after the converter mouth. The lance has been extended.

Heat is introduced by carbon gasification (bottom tuyeres):

$$C+\tfrac{1}{2}O_2\rightarrow CO$$

or afterburning in the upper part of the converter:

$$C+\tfrac{1}{2}O_2\rightarrow CO_2$$

In doing so, up to 55% of CO can be afterburnt with the lance being operated merely with air.

A refractory lining comprising a highly aluminous magnesite ("spinel") turned out to be advantageous. Advantageously, the $Al_2O_3$ content of the slag melt may be raised to at least 22%, thereby causing a self-protecting highly spinel-containing intermediate layer to form at the refractory/slag melt interface.

The addition of $Al_2O_3$ also has a favorable influence on the early strength behavior of the puzzolane cement obtained by water-spray granulation.

In order to remove the phosphorus cumulated in the FeNi bath, the latter is supplied with quick lime, for instance through submerged tuyeres, and refined with oxygen. In doing so, the fertilizer Thomas meal is obtained and the FeNi bath is regenerated.

What I claim is:

1. A process comprising:
   reducing at least one member comprising iron selected from the group consisting of oxidic slag and combustion residue above a reducing metal bath, said reducing metal bath comprising an iron alloy including metals nobler than iron and having a redox potential adjusted such that reduction of iron oxide to iron is avoided;
   adding a member selected from the group consisting of Al, FeSi, and C to said reducing metal bath to control said redox potential; and
   maintaining said reducing metal bath at a carbon content of below 5% by weight.

2. A process according to claim 1, wherein said iron alloy is selected from the group consisting of FeNi, FeCu, and Sn-containing alloys.

3. A process according to claim 1, further comprising providing bottom tuyeres in said reducing metal bath for injecting flush gas through said reducing metal bath.

4. A process according to claim 1, further comprising heating said reducing metal bath indirectly.

5. A process according to claim 4, further comprising heating said reducing metal bath inductively.

6. A process according to claim 1, wherein said maintaining step comprises maintaining said reducing metal bath at a carbon content of below 4% by weight.

7. A process comprising:
   providing an oxidizinigly operated meltdown reactor, and receiving and melting at least one member comprising copper selected from the group consisting of oxidic slag and combustion residue to form a slag melt;
   transferring said slag melt into a fore-hearth;

setting a temperature within said fore-hearth to above 1500°° C. and heating said slag melt in said fore-hearth to provide a copper melt;

separating said copper melt from said slag melt by tapping said copper melt from said fore-hearth at said temperature while retaining in said fore-hearth a completely oxidized slag bath, said completely oxidized slag bath comprising iron oxide;

discontinuously charging said completely oxidized slag bath into a reducing metal bath contained in a metal bath reactor, said reducing metal bath comprising an iron alloy including metals nobler than iron and having a redox potential adjusted such that reduction of iron oxide to iron is avoided;

adding a member selected from the group consisting of Al, FeSi, and C to said reducing metal bath to control said redox potential; and maintaining said reducing metal bath at a carbon content of below 5% by weight.

8. A process according to claim 7, further comprising providing a gas space in said fore-hearth and arranging auxiliary burners for heating said fore-hearth while effecting excess stoichiometric combustion within said gas space.

9. A process according to claim 7, further comprising providing a gas space in said fore-hearth and arranging a melting cyclone in open communication to said gas space for heating said fore-hearth while effecting excess stoichiometric combustion within said gas space.

10. A process according to claim 7, further comprising blowing air or oxygen through said slag melt contained in said fore-hearth.

11. A process according to claim 7, further comprising charging said oxidizing operated meltdown reactor with at least one charging substance selected from the group consisting of slags, dust, ashes, and dry sewage sludge.

12. A process according to claim 11, wherein said slags, dust, and ashes are derived from waste incineration.

13. A process according to claim 11, wherein said slags, dust, and ashes are derived from sewage sludge disposal.

14. A process according to claim 7, wherein said oxidizingly operated meltdown reactor is configured as at least one melting apparatus arranged in open communication with said fore-hearth and is a member selected from the group consisting of a shaft furnace, a cupola furnace, and a melting cyclone.

15. A process according to claim 8, wherein said oxidic slag or combustion residue further comprises Zn and Pb, and wherein said process further comprises:

providing an additional gas space above said reducing metal bath;

withdrawing gas from said additional gas space;

cooling said gas withdrawn from said additional gas space for separating Zn and Pb from CO;

recycling said CO to said oxidizingly operated meltdown reactor; and afterburning said remaining CO in said oxidizingly operated meltdown reactor in excess stoichiometrically.

16. A process according to claim 1, wherein said at least one member is selected from the group consisting of iron slag and combustion residue comprising iron oxide.

17. A process according to claim 9, wherein said oxidic slag or combustion residue further comprises Zn and Pb, and wherein said process further comprises:

providing an additional gas space above said reducing metal bath;

withdrawing gas from said additional gas space;

cooling said gas withdrawn from said additional gas space for separating Zn and Pb from CO;

recycling said CO to said oxidizingly operated meltdown reactor; and afterburning said remaining CO in said oxidizingly operated meltdown reactor in excess stoichiometrically.

* * * * *